Patented Feb. 19, 1929.

1,702,303

UNITED STATES PATENT OFFICE.

ALBERT KAHN, OF PARIS, FRANCE, ASSIGNOR TO SOCIÉTÉ FRANCAISE DES PRODUITS ALIMENTAIRES AZOTES, OF PARIS, FRANCE, A CORPORATION OF FRANCE.

MANUFACTURE OF FOOD AND OTHER USEFUL PRODUCTS FROM LOWER VEGETABLES.

No Drawing. Application filed December 16, 1925. Serial No. 75,873.

This invention has for its object an improved process for manufacturing by way of an autolysis, food and other useful products from lower vegetables such as distillery (alcohol) yeast, rhizopus or amylomyces.

According to my invention I take distillery yeast, rhizopus or amylomyces and I separate practically from it the alcohol it contains and I submit said yeast to an autolysis adding thereto 5% to 20% of its weight of sodium chloride. The autolysis is carried on during from one to five days at a temperature between 40° C. and a temperature under the minimum at which the ferments are destroyed.

The percentage of this salt varies according to the kind and to the state of freshness of the yeasts used. The fresher the yeast the less the amount of the salt required. The autolysis of this kind of yeast takes place with the maximum of quickness when the mass is brought to a favorable temperature—which may be for instance according to the species from 40° to 55° C. during a few hours and then adding suddenly for example from 5 to 10% of sodium chloride.

The autolysis is carried on for a duration varying from two to five days according to the species of the yeasts which are to be treated, the temperature being maintained between 40° C. and the maximum temperature under which the ferments are destroyed and the mass being preferably stirred frequently in presence of air or under shelter of air.

The aminated acids formed during the autolysis are separated from the cellulosic residues in the ordinary way (sieving, centrifuging, filtering, etc.) They may be concentrated in vacuo to a sirupy or pasty state and even be dried and then powdered.

The products obtained by the above improved process have been found to be specially palatable food products.

The cellulosic residues of the autolysis above set forth may be emulsified with grease or oil or soap, or unsaponifiable matters, as they possess high emulsifying properties towards such bodies. Such emulsions constitute artificial "degras" or "moellons" which may be used in tanning and tawing industries in the same manner as the natural products of that kind.

What I claim is:

1. An improved process for treating distillery yeast in which 5 to 20% sodium chloride is added to distillery yeast containing no alcohol the mass being autolyzed during from one to five days at a temperature between 40° C. and a temperature under the minimum temperature at which the ferments are destroyed.

2. An improved process for treating distillery yeast in which the yeast is brought to a temperature between 40° to 55° C. during a few hours when an amount of 5 to 20% in weight of common salt is added thereto and the autolysis carried on during from 1 to 5 days at a temperature comprised between 40° C. and a temperature under the minimum temperature at which the ferments are destroyed.

3. An improved process for treating distillery yeast in which the yeast is brought to a temperature between 40° to 55° C. during a few hours when an amount of 5 to 20% in weight of common salt is added thereto and the autoylsis carried on during 1 to 5 days at a temperature between 40° C. and a temperature under the minimum temperature at which the ferments are destroyed and then separating the autolysate from the cellulosic residues.

In testimony whereof I have affixed my signature.

ALBERT KAHN.